United States Patent
Goodrow et al.

(10) Patent No.: US 8,495,157 B2
(45) Date of Patent: Jul. 23, 2013

(54) METHOD AND APPARATUS FOR DISTRIBUTED POLICY-BASED MANAGEMENT AND COMPUTED RELEVANCE MESSAGING WITH REMOTE ATTRIBUTES

(75) Inventors: Dennis Sidney Goodrow, Santa Rosa, CA (US); Amrit Tsering Williams, Alamo, CA (US); Gregory Mitchell Toto, Piedmont, CA (US); Peter Benjamin Loer, Oakland, CA (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/882,106

(22) Filed: Sep. 14, 2010

(65) Prior Publication Data

US 2011/0029626 A1     Feb. 3, 2011

Related U.S. Application Data

(63) Continuation-in-part of application No. 12/044,614, filed on Mar. 7, 2008, now Pat. No. 8,161,149.

(60) Provisional application No. 60/893,528, filed on Mar. 7, 2007, provisional application No. 61/242,278, filed on Sep. 14, 2009.

(51) Int. Cl.
    *G06F 15/16*         (2006.01)

(52) U.S. Cl.
    USPC .......................................... 709/206; 709/207

(58) Field of Classification Search
    USPC .................................. 709/206, 207, 227, 229
    See application file for complete search history.

(56) References Cited

U.S. PATENT DOCUMENTS

| | | | |
|---|---|---|---|
| 5,010,571 A | 4/1991 | Katznelson et al. | |
| 5,586,304 A | 12/1996 | Stupek, Jr. et al. | |
| 5,649,099 A | 7/1997 | Theimer et al. | |
| 5,732,137 A | 3/1998 | Aziz | |
| 5,751,967 A | 5/1998 | Raab et al. | |
| 5,958,050 A | 9/1999 | Griffin et al. | |

(Continued)

FOREIGN PATENT DOCUMENTS

| | | |
|---|---|---|
| JP | 2001318814 | 11/2001 |
| JP | 2002523841 | 7/2002 |

(Continued)

OTHER PUBLICATIONS

APT Team, "Main Page of APT-GET", http://web.archive.org/web/20041027155110/http://linuxreviews.org/man/apt-get; Viewed Online Jul. 11, 2012, Mar. 12, 2001, 1-12.

(Continued)

*Primary Examiner* — Asad Nawaz
*Assistant Examiner* — Syed S Ali
(74) *Attorney, Agent, or Firm* — Michael A. Glenn; Glenn Patent Group

(57) ABSTRACT

An embodiment of the invention provides a technique that extends relevance-based computation to include computation based on information accessed from or exchanged with other agents. Mechanisms are provided by which an agent accesses or exchanges information between or among other agents and may include one or more of: central bulletin board, broadcast, direct request—pull, direct request—push, and server-routed. Architectural models of distributed decision making to facilitate a distributed and policy-based management of IT infrastructure are provided.

7 Claims, 11 Drawing Sheets

U.S. PATENT DOCUMENTS

| | | | |
|---|---|---|---|
| 6,123,737 A * | 9/2000 | Sadowsky | 717/173 |
| 6,128,738 A | 10/2000 | Doyle et al. | |
| 6,151,643 A | 11/2000 | Cheng et al. | |
| 6,161,218 A | 12/2000 | Taylor | |
| 6,192,404 B1 | 2/2001 | Hurst et al. | |
| 6,233,449 B1 | 5/2001 | Glitho et al. | |
| 6,233,612 B1 | 5/2001 | Fruchtman et al. | |
| 6,237,144 B1 | 5/2001 | Delo | |
| 6,240,390 B1 | 5/2001 | Jih | |
| 6,240,394 B1 | 5/2001 | Uecker et al. | |
| 6,240,451 B1 | 5/2001 | Campbell et al. | |
| 6,256,664 B1 | 7/2001 | Donoho et al. | |
| 6,256,668 B1 | 7/2001 | Silvka et al. | |
| 6,263,362 B1 | 7/2001 | Donoho et al. | |
| 6,289,394 B1 | 9/2001 | Kozuka | |
| 6,289,510 B1 | 9/2001 | Nakajima | |
| 6,321,258 B1 | 11/2001 | Stolfus et al. | |
| 6,324,691 B1 | 11/2001 | Gazdik | |
| 6,324,693 B1 | 11/2001 | Brodersen et al. | |
| 6,327,617 B1 | 12/2001 | Fawcett | |
| 6,330,715 B1 | 12/2001 | Razzaghe-Ashrefi | |
| 6,345,386 B1 | 2/2002 | Dolo | |
| 6,347,396 B1 | 2/2002 | Gard | |
| 6,347,398 B1 | 2/2002 | Parthasarathy et al. | |
| 6,351,536 B1 | 2/2002 | Sasaki et al. | |
| 6,353,902 B1 * | 3/2002 | Kulatunge et al. | 714/712 |
| 6,353,926 B1 | 3/2002 | Parthasarathy | |
| 6,353,928 B1 | 3/2002 | Atberg et al. | |
| 6,356,936 B1 | 3/2002 | Donoho et al. | |
| 6,360,366 B1 * | 3/2002 | Heath et al. | 717/178 |
| 6,363,524 B1 | 3/2002 | Loy | |
| 6,378,128 B1 | 4/2002 | Edelstein et al. | |
| 6,381,742 B2 | 4/2002 | Forbes et al. | |
| 6,389,464 B1 | 5/2002 | Krishnamurthy et al. | |
| 6,389,589 B1 | 5/2002 | Mishra et al. | |
| 6,405,250 B1 | 6/2002 | Lin et al. | |
| 6,407,988 B1 | 6/2002 | Agraharam et al. | |
| 6,418,478 B1 | 7/2002 | Ignatius et al. | |
| 6,418,554 B1 | 7/2002 | Dolo et al. | |
| 6,449,642 B2 | 9/2002 | Bourke-Dunphy et al. | |
| 6,460,175 B1 | 10/2002 | Ferr et al. | |
| 6,477,703 B1 * | 11/2002 | Smith et al. | 717/168 |
| 6,493,594 B1 * | 12/2002 | Kraml | 700/19 |
| 6,496,977 B1 | 12/2002 | Hamilton, II et al. | |
| 6,516,316 B1 | 2/2003 | Ramasubramani et al. | |
| 6,523,166 B1 * | 2/2003 | Mishra et al. | 717/174 |
| 6,526,507 B1 | 2/2003 | Cromer et al. | |
| 6,532,491 B1 | 3/2003 | Lakis et al. | |
| 6,535,977 B1 | 3/2003 | Holle et al. | |
| 6,557,054 B2 | 4/2003 | Reisman | |
| 6,571,186 B1 | 5/2003 | Ward | |
| 6,574,537 B2 | 6/2003 | Kipersztok et al. | |
| 6,594,369 B1 | 7/2003 | Une | |
| 6,594,692 B1 | 7/2003 | Reisman | |
| 6,594,759 B1 | 7/2003 | Wong | |
| 6,604,130 B2 | 8/2003 | Donoho et al. | |
| 6,611,862 B2 | 8/2003 | Reisman | |
| 6,622,146 B1 | 9/2003 | Sato et al. | |
| 6,654,714 B1 | 11/2003 | Gentile et al. | |
| 6,658,464 B2 | 12/2003 | Reisman | |
| 6,658,489 B1 | 12/2003 | Asselin | |
| 6,681,243 B1 | 1/2004 | Putzolu et al. | |
| 6,725,242 B2 | 4/2004 | Gardner | |
| 6,725,452 B1 | 4/2004 | Te'eni et al. | |
| 6,735,766 B1 | 5/2004 | Chamberlain et al. | |
| 6,745,224 B1 | 6/2004 | D'Souza et al. | |
| 6,745,766 B2 | 6/2004 | Fini | |
| 6,751,661 B1 | 6/2004 | Geddes et al. | |
| 6,763,517 B2 | 7/2004 | Hines | |
| 6,769,009 B1 | 7/2004 | Reisman | |
| 6,789,255 B1 | 9/2004 | Pedrizetti et al. | |
| 6,802,061 B1 | 10/2004 | Parthasarathy et al. | |
| 6,804,663 B1 | 10/2004 | Dolo | |
| 6,836,794 B1 | 12/2004 | Lucovsky et al. | |
| 6,851,115 B1 | 2/2005 | Cheyer et al. | |
| 6,871,281 B2 | 3/2005 | Schwab et al. | |
| 6,904,457 B2 | 6/2005 | Goodman | |
| 6,920,631 B2 | 7/2005 | Dolo | |
| 6,922,831 B1 | 7/2005 | Kroening et al. | |
| 6,931,434 B1 | 8/2005 | Donoho et al. | |
| 6,941,453 B2 | 9/2005 | Rao | |
| 6,954,790 B2 | 10/2005 | Forslow | |
| 6,971,094 B1 | 11/2005 | Ly | |
| 6,996,815 B2 | 2/2006 | Bourke-Dunphy et al. | |
| 6,996,819 B1 | 2/2006 | Alanis | |
| 7,134,019 B2 | 11/2006 | Shelest et al. | |
| 7,137,040 B2 | 11/2006 | Bae et al. | |
| 7,185,229 B2 | 2/2007 | Cromer et al. | |
| 7,275,048 B2 | 9/2007 | Bigus et al. | |
| 7,277,919 B1 | 10/2007 | Donoho et al. | |
| 7,398,272 B2 * | 7/2008 | Hindawi et al. | 709/203 |
| 7,523,190 B1 | 4/2009 | Bickerstaff et al. | |
| 7,558,953 B2 | 7/2009 | Osthoff et al. | |
| 7,620,816 B1 | 11/2009 | Vigue et al. | |
| 7,668,938 B1 | 2/2010 | Phillips et al. | |
| 7,962,632 B2 * | 6/2011 | Lipsanen | 709/229 |
| 8,055,617 B2 | 11/2011 | Hindawi et al. | |
| 8,161,149 B2 | 4/2012 | Lippincott et al. | |
| 8,171,364 B2 | 5/2012 | Veillette et al. | |
| 2001/0032091 A1 | 10/2001 | Schultz et al. | |
| 2001/0042104 A1 | 11/2001 | Donoho et al. | |
| 2002/0112200 A1 | 8/2002 | Hines | |
| 2002/0147764 A1 | 10/2002 | Krupczak | |
| 2002/0152384 A1 | 10/2002 | Shelest et al. | |
| 2002/0188691 A1 | 12/2002 | Ignatius et al. | |
| 2003/0033394 A1 | 2/2003 | Stine | |
| 2003/0033396 A1 * | 2/2003 | McCall | 709/223 |
| 2003/0033400 A1 | 2/2003 | Pawar et al. | |
| 2003/0074321 A1 | 4/2003 | Peled | |
| 2003/0074358 A1 | 4/2003 | Sarbaz et al. | |
| 2003/0088542 A1 | 5/2003 | McGee et al. | |
| 2003/0097454 A1 | 5/2003 | Yamakawa et al. | |
| 2003/0126256 A1 | 7/2003 | Cruickshank et al. | |
| 2003/0187868 A1 | 10/2003 | Igarashi | |
| 2003/0233645 A1 | 12/2003 | Cohen et al. | |
| 2003/0233646 A1 | 12/2003 | Cohen et al. | |
| 2004/0039816 A1 * | 2/2004 | Bae et al. | 709/225 |
| 2004/0117275 A1 | 6/2004 | Billera | |
| 2004/0174904 A1 | 9/2004 | Kim et al. | |
| 2004/0187105 A1 | 9/2004 | Inada et al. | |
| 2004/0213211 A1 | 10/2004 | Green et al. | |
| 2004/0215781 A1 | 10/2004 | Pulsipher et al. | |
| 2004/0230644 A1 | 11/2004 | Aratake et al. | |
| 2004/0246975 A1 | 12/2004 | Joshi et al. | |
| 2004/0255048 A1 | 12/2004 | Lev Ran et al. | |
| 2004/0260949 A1 | 12/2004 | Aoki et al. | |
| 2005/0002408 A1 | 1/2005 | Lee et al. | |
| 2005/0005026 A1 | 1/2005 | Brown et al. | |
| 2005/0054327 A1 | 3/2005 | Johnston et al. | |
| 2005/0086477 A1 | 4/2005 | Lin et al. | |
| 2005/0086534 A1 | 4/2005 | Hindawi et al. | |
| 2005/0091501 A1 | 4/2005 | Osthoff et al. | |
| 2005/0120160 A1 | 6/2005 | Plouffe et al. | |
| 2006/0095388 A1 | 5/2006 | Brown et al. | |
| 2006/0253446 A1 | 11/2006 | Leong et al. | |
| 2007/0050645 A1 | 3/2007 | Siegmund et al. | |
| 2007/0204078 A1 * | 8/2007 | Boccon-Gibod et al. | 710/54 |
| 2007/0288914 A1 | 12/2007 | Brannock et al. | |
| 2008/0016335 A1 | 1/2008 | Takahashi et al. | |
| 2008/0052054 A1 | 2/2008 | Beverina et al. | |
| 2008/0192695 A1 | 8/2008 | Krishnan et al. | |
| 2008/0201462 A1 * | 8/2008 | Liss et al. | 709/223 |
| 2009/0019525 A1 | 1/2009 | Yu et al. | |
| 2010/0017494 A1 * | 1/2010 | Hindawi et al. | 709/206 |
| 2010/0228947 A1 | 9/2010 | Sasao et al. | |
| 2010/0332640 A1 | 12/2010 | Goodrow et al. | |
| 2011/0029626 A1 | 2/2011 | Goodrow et al. | |
| 2011/0066752 A1 | 3/2011 | Lippincott et al. | |
| 2011/0066841 A1 | 3/2011 | Goodrow et al. | |
| 2011/0222691 A1 | 9/2011 | Yamaguchi et al. | |
| 2012/0203818 A1 | 8/2012 | Lippincott et al. | |

FOREIGN PATENT DOCUMENTS

| | | |
|---|---|---|
| JP | 2002247033 | 8/2002 |
| JP | 200376434 | 3/2003 |
| WO | WO03040944 | 5/2003 |

OTHER PUBLICATIONS

Arnaud, et al., "How to Disable Security Warning Popup About Message Containing Script", http://forum.bigfix.com/viewtopic.php?id=1519; Accessed Online Jul. 12, 2012, Nov. 15, 2007, 2 Pages.

Bigfix, "New Features in BES 4.0", Available online: http://web.archive.org/web/20061026095436/http://support.bigfix.com/bes/changes_4_0.html, Oct. 26, 2006, 1 Page.

Bigfix, Inc., "BES Console Context Menu Wake-on LAN", http://web.archive.org/web/20061026092909/http://support.bigfix.com/bes/misc/bes-wol.html; Archived Oct. 26, 2006, 1 page.

Bigfix, Inc., "BigFix Action Language Reference: A Guide to the BigFix Action Shell Commands for the BigFix Enterprise Suite (BES)", BigFix, Inc. Emeryville, CA. Compatible with BES Version 6.0, Dec. 6, 2006, 59 Pages.

Bigfix, Inc., "BigFix Client ICMP Traffic Technical Details", http://support.bigfix.com/bes/misc/besclient_icmp.html; Version 5.1, 6.0. Accessed online Jun. 16, 2012, copyright 2011, 1-5.

Bigfix, Inc., "BigFix Enterprise Suite (BES) Administrator's Guide", BigFix, Inc. Emeryville, CA. Version 7.1, Jul. 25, 2008, 108 Pages.

Bigfix, Inc., "BigFix Enterprise Suite (BES) Console Operator's Guide", BigFix, Inc. Emeryville, CA. Version 7.1; last modified Jul. 26, 2008, copyright 2008, 182 Pages.

Bigfix, Inc., "BigFix Remote Desktop for Windows", Version 1.0. http://support.bigfix.com/product/documents/BigFixRemoteDesktopGuide-v1.pdf. Viewed online Jul. 11, 2012., Sep. 13, 2007, 13 pages.

Bigfix, Inc., "Wake on LAN With a Alteration", http://forum.bigfix.com/viewtopic.php?id=3248; Viewed online Jul. 11, 2012., May 14, 2009, 3 pages.

Burrows, Daniel, "Modelling and Resolving Software Dependencies", Jun. 15, 2005, 1-16.

Cisco Systems, Inc., "Configuring the Cisco IOS DHCP Relay Agent", Cisco Systems, Inc. 170 West Tasman Drive, San Jose, CA 95134-1706, USA. First Published May 2, 2005, Nov. 17, 2006, 26 Pages.

Cstoneba, "BES Deployment—Wake On Lan", retrieved on Aug. 1, 2012 online from url:http://forum.bigfix.com/viewtopic.php?pid=12542, Apr. 29, 2009, 4 pages.

Firstbrook, Peter et al., "Magic Quadrant for Endpoint Protection Platforms", Gartner, Inc., Dec. 21, 2007, 1-16.

Held, G et al., "The Internet Protocol and Related Protocols: Chapter 4", The ABCs of TCP/IP. Auerbach Publications., 2002, 56 Pages.

IBM, "Last Man Standing", http://www-01.ibm.com/support/docview.wss?uid=swg21506077; Accessed Online Aug. 1, 2012, 1-4.

Johnson, David B. et al., "DSR: The Dynamic Source Routing Protocol for Multi-Hop Wireless Ad Hoc Networks", http://www.monarch.cs.cmu.edu; Computer Science Department. Carnegie Mellon University, Pittsburgh, PA 15213-3891, 2001, 1-25.

Jreinec, et al., "Using a DOS Variable in Action Script", http://forum.bigfix.com/viewtopic.php?id=1867; Accessed online Jul. 12, 2012, Mar. 24, 2008, 1 Page.

Kessler, G et al., "An Overview of Cryptographic Methods", Network Design: Principles and Applications. Edited by Gilbert Held. Auerbach Publications., 2000, 679-691.

Knuth, Donald E., "The Art of Computer Programming", Second Edition. Volume 3: Sorting and Searching. Addison Wesley Longman Publishing Co., Inc., Mar. 1998, 39 Pages.

Kus, Ben et al., "BigFix 7.1 Released", http://forum.bigfix.com/viewtopic.php?id=2258; Viewed Online Jul. 11, 2012., Aug. 5, 2008, 2 pages.

Leach, Paul J. et al., "CIFS/E Browser Protocol", Microfsoft Internet Engineering Task Force. Network Working Group, Internet Draft., Jan. 10, 1997, 1-24.

Menezes, P. et al., "Chapter 8: Public-Key Encryption", Handbook of Applied Cryptography. CRC Press., 1996, 37 Pages.

Mgoodnow, "Relay on the DMZ", http://forum.bigfix.com/viewtopic.php?id=428; Accessed Online Jul. 23, 2012, Nov. 30, 2006, 6 Pages.

Nholmes, et al., "BES Automatic Relay Settings", http://forum.bigfix.xom/viewtopic.php?id=182; Accessed Online Jul. 11, 2012., Sep. 18, 2006, 1-4.

OWASP, "Positive Security Model", Open Web Application Security Project (OWASP). http://web.archive.org/web/20060821235729/http://www.owasp.org/index.php/Positive_security_model, Aug. 21, 2006, 2 Pages.

Tang, Hong et al., "Self-Organizing Networks of Communications and Computing", International Transactions on Systems Science and Applications, vol. 1, No. 4., Nov. 6, 2006, pp. 421-431.

Tipton, H et al., "Information Security Management Handbook: 2006 Edition", Auerbach Publications. Glossary., 2006, 179 Pages.

Todorov, Dobromir, "Chapter 1: User Identification and Authentication Concepts", From the book: Mechanics of User Identification and Authentication: Fundamentals of Identity Management. Auerbach Publications. Takir & Francis Group, LLC., 2007, 1-64.

U.S. Department of Commerce, "Entity Authentication Using Public Key Cryptography", National Institute of Standards and Technology. Federal Information Processing Standards Publication. FIPS PUB 196., Feb. 18, 1997, 52 Pages.

* cited by examiner

| 708 | 710 | 712 | 714 |
|---|---|---|---|
| 4. Universal Management Agent | 5. Peer to Peer for Discovery | 6. Peer to Peer for Discovery and Control - Individual Decision Making | 7. Peer to Peer for Discovery and Control - Collaborative Decision Making |
| 1. Self: relay end point state<br>2. Environment-unmanaged | 1. Self: relay end point state Environment-unmanaged<br>2. Environment-managed (other end points provide input in discovery) | 1. Self: relay end point state<br>2. Environment-unmanaged<br>3. Environment-managed (other end points provide input in discovery) | 1. Self: relay end point state<br>2. Environment-unmanaged<br>3. Environment-managed (other end points provide input in discovery) |
| 1. Self: computation of intelligence about relay end point<br>2. Environment-unmanaged: computation of intelligence about the unmanaged environment | 1. Self: computation of intelligence about relay end point<br>2. Environment-unmanaged: computation of intelligence about the unmanaged environment<br>3. Environment-managed: computation of intelligence about the managed environment | 1. Self: computation of intelligence about relay end point<br>2. Environment-unmanaged: computation of intelligence about the unmanaged environment<br>3. Environment-managed: computation of intelligence about the managed environment | 1. Self: computation of intelligence about relay / end point<br>2. Environment-unmanaged: computation of intelligence about the unmanaged environment<br>3. Environment-managed: computation of intelligence about the managed environment |
| 1. Self: modification of | 1. Self: modification of | 1. Self: modification of | 1. Self: modification of |

FIG. 7A (Con't)

|  | 1. End Point Centric | 2. Environmentally Aware End Point Cemtric | 3. Communications Relay |
|---|---|---|---|
|  | of end point state | end point state | relay end point state |
| In-bound Communication | 1. Hierarchical: from server to end point | 1. Hierarchical: from server to end point | 1. Hierarchical: from server to relay<br>2. Hierarchical: from end points to relay |
| Outbound Communication | 1. Hierarchical: from end point to server | 1. Hierarchical: from end point to server | 1. Hierarchical: from relay to server<br>2. Hierarchical: from relay to end points |

*FIG. 7B*

| 4. Universal Management Agent | 5. Peer to Peer for Discovery | 6. Peer to Peer for Discovery and Control - Individual Decision Making | 7. Peer to Peer for Discovery and Control - Collaborative Decision Making |
|---|---|---|---|
| relay end point state<br>2. Environment-unmanaged<br>3. Environment-managed | relay end point state<br>2. Environment-unmanaged<br>3. Environment-managed | relay end point state<br>2. Environment-unmanaged<br>3. Environment managed<br>4. Environment managed - via policy | relay end point state<br>2. Environment-unmanaged<br>3. Environment managed<br>4. Environment managed - via policy |
| 1. Hierarchical: from server to relay<br>2. Hierarchical: from end points to relay | 1. Hierarchical: from server to relay<br>2. Hierarchical: from end points to relay<br>3. Peer to peer: for collection of discovery information | 1. Hierarchical: from server to relay<br>2. Hierarchical: from end points to relay<br>3. Peer to peer: for collection of discovery information | 1. Hierarchical: from server to relay<br>2. Hierarchical: from end points to relay<br>3. Peer to peer: for collection of discovery information |
| 1. Hierarchical: from relay to server<br>2. Hierarchical: from relay to end points | 1. Hierarchical: from relay to server<br>2. Hierarchical: from relay to end points<br>3. Peer to peer: for publication of discovery information | 1. Hierarchical: from relay to server<br>2. Hierarchical: from relay to end points<br>3. Peer to peer: for publication of discovery information<br>4. Peer to peer: for | 1. Hierarchical: from relay to server<br>2. Hierarchical: from relay to end points<br>3. Peer to peer: for publication of discovery information<br>4. Peer to peer: for |

FIG. 7B (Con't)

|  | 1. End Point Centric | 2. Environmentally Aware End Point Cemtric | 3. Communications Relay |
|---|---|---|---|
|  |  |  |  |
| Decision Processing / Policy Evaluation | 1. Self-contained: individually performed by the agent | 1. Self-contained: individually performed by the agent | 1. Self-contained: individually performed by the agent |
| Trust Model | 1. Master and slave model: server (trusted source of policy) to agents (each individually affiliated to its server). | 1. Master and slave model: server (trusted source of policy) to agents (each individually affiliated to its server). | 1. Master and slave model: server (trusted source of policy) to agents (each individually affiliated to its server). |

FIG. 7C

| 4. Universal Management Agent | 5. Peer to Peer for Discovery | 6. Peer to Peer for Discovery and Control - Individual Decision Making | 7. Peer to Peer for Discovery and Control - Collaborative Decision Making |
|---|---|---|---|
| | | publication of a policy to another agent | publication of a policy to another agent |
| 1. Self-contained: individually performed by the agent | 1. Self-contained: individually performed by the agent | 1. Self-contained: individually performed by the agent | 1. Self-contained: individually performed by the agent<br>2. Collective: multiple agents participate in a shared policy evaluation workflow |
| 1. Master and slave model: server (trusted source of policy) to agents (each individually affiliated to its server). | 1. Master and slave model: server (trusted source of policy) to agents (each individually affiliated to its server).<br>2. Peer to peer: agent to agent trust for discovery | 1. Master and slave model: server (trusted source of policy) to agents (each individually affiliated to its server).<br>2. Peer to peer: agent to agent trust for discovery<br>3. Peer to peer: agent to agent trust for publishing of policy from one agent to another | 1. Master and slave model: server (trusted source of policy) to agents (each individually affiliated to its server).<br>2. Peer to peer: agent to agent trust for discovery<br>3. Peer to peer: agent to agent trust for publishing of policy from one agent to another |

*FIG. 7C (Con't)*

US 8,495,157 B2

METHOD AND APPARATUS FOR DISTRIBUTED POLICY-BASED MANAGEMENT AND COMPUTED RELEVANCE MESSAGING WITH REMOTE ATTRIBUTES

CROSS REFERENCE TO RELATED APPLICATIONS

This application is a continuation-in-part of U.S. patent application Ser. No. 12/044,614, filed Mar. 7, 2008 now U.S. Pat. No. 8,161,149, which claims benefit of U.S. Provisional Application Ser. No. 60/893,528, filed Mar. 7, 2007, and this application claims benefit of U.S. Provisional Application Ser. No. 61/242,278, filed Sep. 14, 2009, each application of which is incorporated herein in its entirety by this reference thereto.

This application is related to U.S. patent application entitled, PLATFORM FOR POLICY-DRIVEN COMMUNICATION AND MANAGEMENT INFRASTRUCTURE, which is commonly owed and which is related to U.S. patent application Ser. No. 10/804,799, now U.S. Pat. No. 7,398,272, filed Mar. 19, 2004, each application of which is incorporated herein in its entirety by this reference thereto.

BACKGROUND OF THE INVENTION

1. Technical Field

The invention relates to communications networks. More particularly, the invention relates to a technique for extending relevance-based computation to include computation based on information accessed from or exchanged with a variety of agents. Techniques also include particular architectural models for distributed decision making.

2. Description of the Background Art

As information and computing technology continues to evolve and continues to become more and pervasive among the general and global population, including enterprises, for example, managing and deploying such technology in any computing environment is challenging.

For example, an enterprise may use a wide variety of different machines for an equally wide variety of purposes. Some machines may be performing the same job, i.e. the enterprise may have multiple machines for scaling purposes, and others of the machines are doing different jobs. However, collectively, they're all doing something important for the enterprise.

As another example, individual computers may need to make decisions about what they need to do, but they now depend on what other computers adjacent to them are doing. For instance, the IT administrator doesn't reboot the middle-tier (the application server) of a three-tier web-application, when end users are still using the application server through the web servers. Typically, the IT administrator waits to make sure the web servers are reconfigured to indicate that the application is unavailable or otherwise redirecting traffic to another application server.

It would be desirable to empower each computing entity to make a decision based on context about some other entity.

It would further be desirable to extend empowerment to each computing element via agents and to extend relevance-based computation to include computation based on information accessed from or exchanged with a variety of agents. It would further be desirable to provide particular architectural models for distributed decision making.

SUMMARY OF THE INVENTION

An embodiment of the invention provides a technique that extends relevance-based computation to include computation based on information accessed from or exchanged with other agents. Mechanisms are provided by which an agent accesses or exchanges information between or among other agents and may include one or more of: central bulletin board, broadcast, direct request—pull, direct request—push, and server-routed. Architectural models of distributed decision making to facilitate a distributed and policy-based management of IT infrastructure are provided.

DETAILED DESCRIPTION OF THE INVENTION

Overview

Manage Collection of Computing Elements

Figure 1:
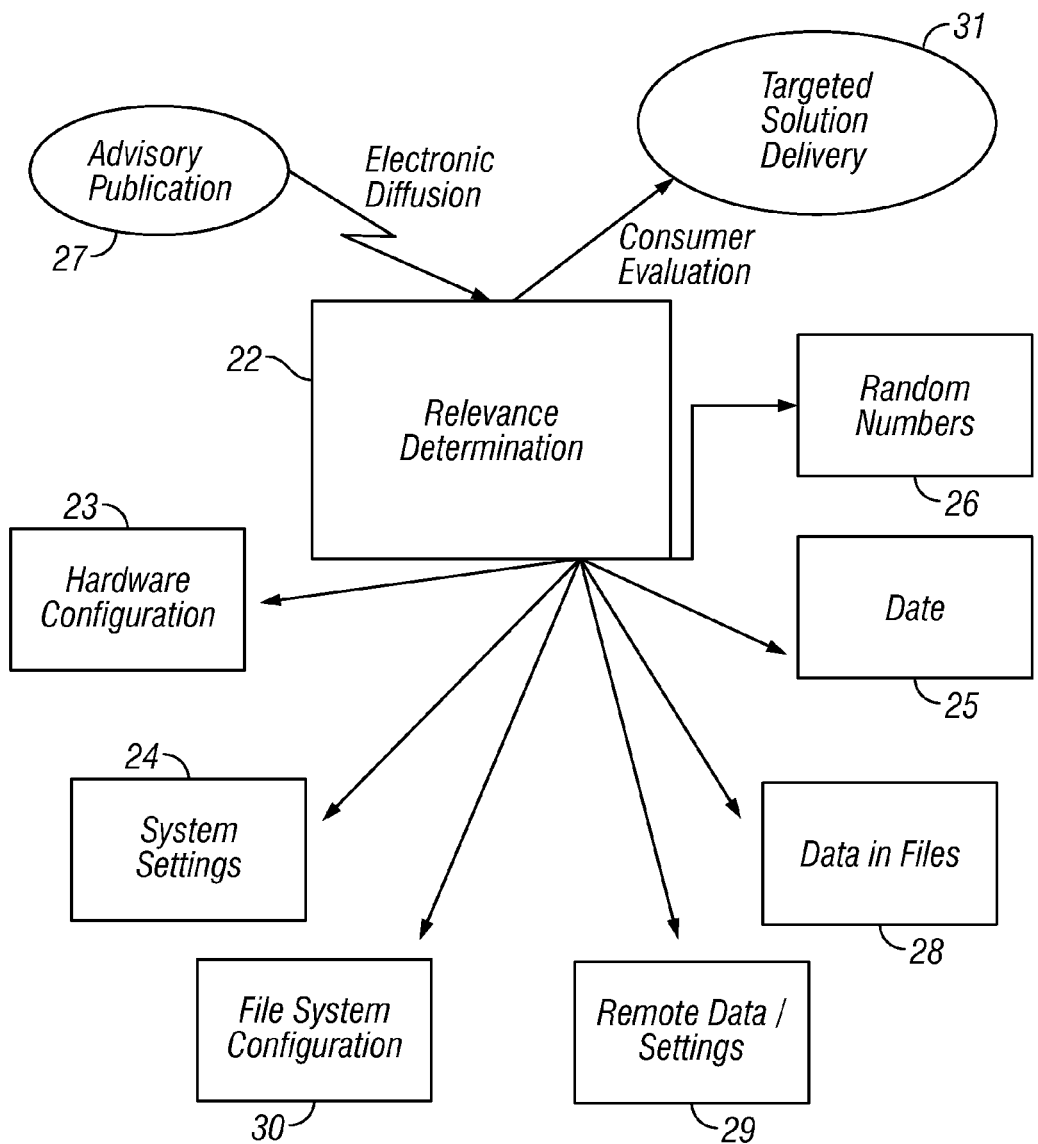
FIG. 1 is a block diagram showing an advisor viewpoint as described in U.S. Pat. No. 7,277,919.

It is desirable to manage more and more entities of an enterprise or an environment. For example, a particular market may be enterprise software and devices, but such entities may be of any type. For example, a device may be a computing process controller, a computer, a device in a computing environment in a stereo, a computer in a car, and so on.

It is desirable to provide more control, more visibility, and make decisions based on characteristics of the environment and other computing devices that are somehow related. For example, suppose an enterprise has a group of computers that serve an application function such as SAP or a web hosting application. The enterprise's system may have 10 servers or 100 servers each performing different parts of the job that collectively use this application, which the enterprise or organization uses. For the purposes of discussion herein, visibility (viewing properties) means to interact with a device in a fashion that collects actual properties from the device itself or interacts with another agent or multiple agents to obtain such properties.

To achieve such monitoring and control, one embodiment provides a relevance engine that evaluates properties of an asset, e.g. of an end point of a device, that are inspectable directly from the device. Thus, properties of the network, properties of the device itself or its environment, software environment, software, etc., can be found. A particular instantiation is an agent, e.g. a software agent that resides on a computer and looks into the hardware and the software and the network stack and can make decisions based on the values of properties that it determines.

In the classic model, web servers, middle-tier application servers, back-end database servers are used; i.e. a host of different machines a re employed. Some of such entities are performing the same job for scaling and some are performing different jobs. Regardless, collectively, such entities are performing functions important for the organization.

An embodiment enables managing such collection, allows decision making, and allows visibility of characteristics of the collection as a whole to make changes, i.e. control the collection as a whole.

Model—Empower Individual Computing Elements

In an embodiment, one model empowers individual computing elements to make such decisions and to take action. Thus, in the case of a middle-tier server, in such model, a management system may have policies that define a particular configuration change should be made when a particular server is not serving a particular end user, for example. As another example, suppose an organization needs to upgrade software and an IT administrator needs to restart 100 different servers. It should be appreciated that there are relationships between those servers and that they need to be restarted in a particular order.

In an embodiment, the overall availability and function of a large group of computers is maintained, while the individual computers make decisions about what each needs to do, aware that each may depend on what activities other computers adjacent to each may be performing. Thus, for example, the new server, the middle-tier, and the application server, are not rebooted when end users are still using such services through the web servers.

Decisions Based on Context

To continue with the above example, an embodiment waits to ensure the web servers are reconfigured. Such collaboration is achieved by empowering the agents, the relevance engines that reside on such servers with a way to access and evaluate context elsewhere. That is for example, an agent residing on the application server inspects properties of other computers, in a variety of different ways. Thus, a computer may make a decision based on context about other entities. One embodiment is discussed in detail hereinbelow.

Agent

In an embodiment, an agent resides on a client and acts as a universal policy engine capable of delivering multiple management services. A single agent may execute a diverse and extensible array of management services ranging from real-time client status reporting, to patch and software distribution, to security policy enforcement, endpoint power management and other systems management and security functions. Thus, by assigning responsibility for reporting and management actions to endpoints themselves, e.g. by way of such agents, a computing platform is enabled visibility and management of IT infrastructures, for example, ranging from hundreds to hundreds of thousands of desktop, mobile and server computers.

In an embodiment, an agent's role in a computing environment may be described as a policy engine: a computational process or context for evaluating content. The agent, a computational resource, uses one or more inspectors to examine its context, decide what is relevant, report properties, take action in such environment and report on the success or failure of such actions. For example, an agent may automatically notify a server or console of changes in managed device configuration, providing a real-time view of device status.

A particular embodiment of an agent using one or more inspectors and embodying relevance evaluations can be found in co-assigned U.S. Pat. No. 6,256,664 to Donoho, D. et al, Method and Apparatus for Computed Relevance Messaging, (issued Jun. 14, 2001), and is incorporated herein in its entirety by this reference thereto.

In such embodiment, a relevance language is used that describes precise conditions under which a given advisory, may be relevant to a consumer, by referring to properties of the environment of the consumer computer interpreting the message, such as system configuration, file system contents, attached peripherals, or remotely accessible data. The humanly-interpretable content in an advisory may describe the condition that triggered the relevance determination and propose an action in response to the condition, which could range from installing software to changing system settings to purchasing information or software. The computer-interpretable content may include software which performs a certain computation or effects a certain change in the system environment.

Advisories are communicated by a process of publication/subscription over a wide-area network such as the Internet. Advisories are placed by their authors at well-known locations, referred to herein as advice sites. Applications referred to as advice readers running on the computers of advice consumers periodically obtain advisories from advice servers which operate at advice sites.

Advice readers process the messages so obtained and automatically interpret the relevance clauses. They determine whether a given message is relevant in the environment defined by the consumer's computer and associated devices. The user is then notified of those messages which are relevant, and the user may read the relevant advisories and invoke the recommended actions.

Relevance evaluation is conducted by parsing relevance language clauses into constituent method dispatches. These clauses invoke specific inspectors which can return specific properties of the computer, its configuration, its file system, or other component of interest. In effect, the list of properties of the environment which may be referred to in the relevance language and verified by the advice reader is determined by the contents of the inspector library installed at run-time.

The existence of standard inspector libraries provides the advice provider with a rich vocabulary for describing the state of the consumer computer and its environment. In one implementation, the collection of inspector libraries can be dynamically expanded by advice providers.

Advice readers operate continually in an automatic mode, gathering advice from many advice providers distributed across public networks such as the Internet, and diagnosing relevance as it occurs.

Advice readers following an advice gathering protocol may operate in a manner which fully respects the privacy of the computer's owner. Information resulting from the relevance determination, i.e. information obtained from the consumer computer, does not leak out to the server. Information on the consumer computer stays on the consumer computer unless the consumer approves its distribution.

The invention can further be understood with reference to relevance based computing as described in Donoho, D. et al, Relevance clause for computed relevance messaging, U.S. Pat. No. 7,277,919 (issued Oct. 2, 2007), and is incorporated herein in its entirety by this reference thereto. In such system: "a collection of computers and associated communications infrastructure to offer a new communications process . . .

allows information providers to broadcast information to a population of information consumers. The information may be targeted to those consumers who have a precisely formulated need for the information. This targeting may be based on information which is inaccessible to other communications protocols. The targeting also includes a time element. Information can be brought to the attention of the consumer precisely when it has become applicable, which may occur immediately upon receipt of the message, but may also occur long after the message arrives. The communications process may operate without intruding on consumers who do not exhibit the precisely-specified need for the information, and it may operate without compromising the security or privacy of the consumers who participate." (Abstract)

One network architecture that embodies such system is the BigFix Enterprise Suiten™ (BigFix, Inc, Emeryville, Calif.), which brings devices in such system under management by installing a native agent on each device. For platforms on which this is feasible, this is considered to be the best method for monitoring and controlling devices. However, there are some platforms for which native agents are infeasible. For instance, network devices may be running proprietary OSs that are not designed to host third-party software. Other devices such as service kiosks or mobile devices may not have the resources available on the device to host a native agent. These platforms can typically be administered over some remotely accessible interface, and may in some cases be able to host limited third-party software.

An embodiment brings devices in a networked environment under the aegis of a distributed management system. In this embodiment, a device is either directly managed by a native agent, or indirectly managed by a pseudo agent. Key to an embodiment is a management system architecture that comprises a management console function and one or more agents in communication with the management console function either directly or indirectly and which perform a relevance determination function. Relevance determination (see FIG. 1), for example, for targeted solution delivery 31, is carried out by an applications program, referred to as the advice reader 22 which, in the prior art (see U.S. Pat. No. 7,277,919) runs on the consumer computer and may automatically evaluate relevance based on a potentially complex combination of conditions, including, but not limited to:

Hardware attributes. These are, for example, the type of computer on which the evaluation is performed, the type of hardware configuration 23, the capacity and uses of the hardware, the type of peripherals attached, and the attributes of peripherals.

Configuration attributes. These are, for example, values of settings for variables defined in the system configuration 30, the types of software applications installed, the version numbers and other attributes of the software, and other details of the software installation or system settings 24.

Database attributes. These are, for example, attributes of files 28 and databases on the computer where evaluation is performed, which may include existence, name, size, date of creation and modification, version, and contents.

Environmental attributes. These are, for example, attributes which can be determined after querying attached peripherals to learn the state of the environment in which the computer is located. Attributes may include results of thermal, acoustic, optical, geographic positioning, and other measuring devices.

Computed attributes. These are, for example, attributes which can be determined after appropriate computations based on knowledge of hardware, configuration, database, and environmental attributes, by applying specific mathematico-logical formulas or specific computational algorithms.

Remote attributes 29. These are, for example, hardware, configuration, database, environmental, and computed attributes that are available by communicating with other computers having an affinity for the consumer or his computer.

Timelines, e.g. Date 25. These are, for example, attributes based on the current time or a time which has elapsed since a key event, such as relevance evaluation or advice gathering.

Personal attributes. These are, for example, attributes about the human user(s) of the computer which can either be inferred by analysis of the hardware, the system configuration, the database attributes, the environmental attributes, or the remote attributes, or else can be obtained by soliciting the information directly from the user(s) or their agents.

Randomization 26. These are, for example, attributes resulting from the application of random and pseudo-random number generators.

Advice Attributes 27. These are, for example, attributes describing the configuration of the invention and the existence of certain advisories or types of advisories in the pool of advice.

In this way, whatever information is actually on the consumer computer or reachable from the consumer computer may in principle be used to determine relevance. The information accessible in this way can be quite general, ranging from personal data to professional work product to the state of specific hardware devices. As a result, an extremely broad range of assertions can be made the subject of relevance determination.

Pseudo-Agents

The invention herein extends this notion beyond a consumer computer to devices or logical structures, such as pseudo-agents, that are physically or logically proximate to a consumer computer. Embodiments of pseudo-agents are described, for example, in co-assigned patent application to Lippincott, L. E., et al, Pseudo-Agents, U.S. patent application Ser. No. 12/044,614 (filed Mar. 7, 2008), and is incorporated herein in its entirety by this reference thereto.

Figure 2:
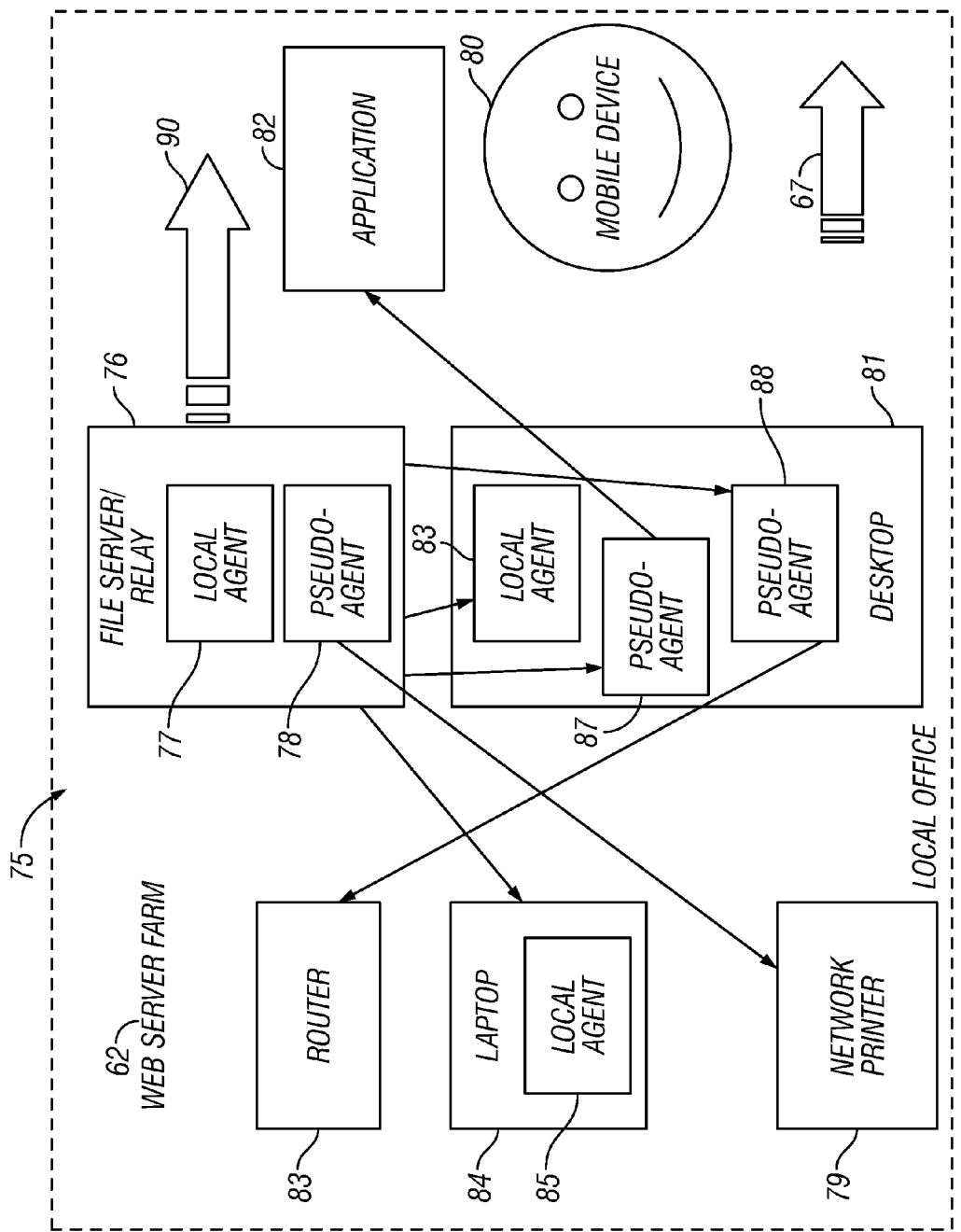
FIG. 2 is a block schematic diagram of a management system architecture which incorporates pseudo-agents, in which a local office is shown, according to an embodiment.

Pseudo-agents can be understood by reference to FIG. 2. In the local office 75 there is a collection of real agents, for example in a file server/relay 76 (agent 77), a desktop computer 81 (agent 83), and a laptop computer 84 (agent 85). Pseudo-agents 78, 87, and 88 are deployed to manage each of the different devices in the local office. In this example, there is a router 83 that has pseudo-agent 88. There is pseudo-agent 78 for a network printer 79 on the file server 76. A mobile device 80 resides most of its time in the local office, but its logical presence is over the cell network 67 and it is in touch with a mobile enterprise server back in the central office.

Another embodiment deploys pseudo-agents to perform asset discovery. For example, a policy says if the result of a local scan shows the presence of devices of a particular type, then deploy pseudo-agents to manage those devices. For example, if wireless access points are identified in a local network scan, then instantiate pseudo-agents to manage against those devices. The IT manager never actually pointed to any one of those devices, but merely created a policy that said, "Based on local information about an environment as a result of a discovery scan, go and assess those devices because they exist." This procedure could be run automatically or as the result of a network scan done by a local agent. For example, there are devices of this sort that are not on a current asset list, but that were discovered through a network scan. A pseudo-agent is then instantiated on the asset that begins, for example, to do a vulnerability scan, or monitor its network traffic by deploying a device that listens to it for policy compliance. All of these actions are defined a priori by policy. No administrative action is necessarily required to set up the environment. Thus, this aspect of the invention allows a management system to deploy one or more pseudo-agents upon the occurrence of certain cases within the policy.

Thus, in an embodiment, a pseudo agent is a relevance context executing in a computing environment, providing visibility and control of entities, such as a device, on which an agent, now pseudo agent, cannot reside. For example, while a printer may not have a computing footprint big enough to install an agent, by way of a pseudo-agent, one skilled in the art may still obtain attributes and other characteristics about the printer. Such pseudo-agent may be considered a computing environment that is dedicated to a particular device. Such pseudo-agent may make decisions about a device, while it does not reside on the device.

Non-local Inspection

An embodiment provides non-local inspection, where, for the purposes of discussion herein, non-local inspection allows a computer or device to make decisions not about a particular entity based on information and properties arrived at or communicated with or exchanged with more than one element in the computing environment. Such other elements may be adjacent in the network, e.g. working collectively on the same application. It should be appreciated that in an embodiment, such elements are grouped in a collection based on what functions each element performs.

In an embodiment, non-local inspection is provided by means of inspectors, as described hereinabove. Such inspectors access properties of other computational elements, e.g. in an embodiment via the agent or pseudo-agent managing the other computational element, instead of or in addition to properties of the endpoint on which the agent resides.

Dependencies between Agents

In an embodiment, agents, e.g. native agent or pseudo-agent, are making decisions and may be related to each other in some way. An agent may be making decisions based on what activities another agent is performing. For example, a second agent related to a first agent may be managing the web server and reconfiguring the web server when the reconfiguration affects the responsibilities of the first agent. Now there are dependencies between these two agents. To facilitate collaboration, an agent needs to be able to inspect, i.e. get information about, other adjacent agents. In an embodiment, an adjacent agent to a first agent is an agent on which the first agent depends in some manner.

In an embodiment, the agent makes decisions about a particular entity where the decision is based on other decisions made by other agents.

Empower Infrastructure to Manage Environment

As discussed above, an embodiment is provided in which the infrastructure is empowered. For example, the computers of an environment, e.g. a network, a house, a collection of agents in your car, or in an industrial plant, are empowered collectively with the knowledge of how to manage the environment. Put another way—instead of decisions being made centrally, such decisions are made collectively, in a distributed way. In an embodiment, agents have inspectors that inspect properties of other devices, either directly by authenticating with the device and evaluating the properties, or asking that other agent to evaluate a relevance expression against itself and return the value. For example, Agent A may remotely access the machine that Agent B resides on, evaluate relevance against it and make some decision based on the computed value. As another example, Agent A may pass a relevance expression to Agent B (or pseudo agent B). Agent B may evaluate that expression and return the result to Agent A.

Central Bulletin Board

An embodiment provides other kinds of architectures, such as for example by way of a central bulletin board, which are discussed in detail hereinbelow, in the section, EXAMPLE EMBODIMENTS OF COMPUTED RELEVANCE MESSAGING WITH REMOTE ATTRIBUTES.

In an embodiment, Agent A, via an inspector responsible for providing information concerning a property of interest, posts in a central bulletin board or a whiteboard a relevance expression in two parts. The first part is a relevance expression that specifies the particular characteristics that identify the agents that should evaluate the second part of the relevance expression. Those agents that are relevant to the first expression, evaluate the second expression and return the result of the evaluation, posting the result to the bulletin board for consumption by the inspector of Agent A. Other agents in the environment may use such shared message board to share information. The messages may be encrypted.

In an embodiment, in order to expand the scalability of the system (the number of agents that can exchange messages with each other), the agents post to the central bulletin board mediated by a hierarchy of one or more relay agents that may relay, aggregate, compress, cache, encrypt and authenticate communication from said first agent to said central bulletin board. Other agents in the environment may use the hierar'chy of one or more relay agents to access information from the central bulletin board. The relay hierarchy may cache versions (and deltas), of the central bulletin board enabling a very large population of agents to be served by distributing the communications load away from the central bulletin board and into the relay hierarchy.

An embodiment provides different ways of facilitating a non-local expression so that an agent, i.e. a computing context, can make decisions based on not just the properties it can directly access, but properties that come from other machines in their environment.

Thus, agents may either exclusively or based on relevance obtain information from and make decisions from other computing elements in the environment.

Example

Broadcast a Relevance Expression

An embodiment provides a model by which an agent may broadcast a relevance expression. Such broadcast may convey that any computing element that evaluates a particular relevance expression and determines that this expression is appropriate to them, then compute a particular question and return or provide the answer. The return answer may be directed specifically to the requesting agent or may be broadcast in turn. The broadcast communication and/or the return answer may be encrypted.

An embodiment provides a peer to peer network that includes targeting information as part of a relevance expression. Again, such messaging requests that peer elements evaluate a particular relevance expression and determine whether this expression is appropriate to them, and when yes, then compute a particular question and return or provide the answer. The communication and/or the return answer may be encrypted.

Example

Server-Routed

An embodiment provides a model by which agents expose (communicate) properties of the devices they manage to a central server. In this embodiment, any agent can target a message to such exposed agents via the central server and the relay hierarchy. A detailed description can be found hereinbelow in the section entitled, Server—Routed.

Extend Computation

An embodiment provides a mechanism for extending computation, i.e. where the computation doesn't have to have to happen in the context of a single computing entity.

For example, suppose an enterprise has a policy that applies to an aggregate set of machines. According to an embodiment, a single policy which is available to the environment and an entire body of machines based on relevance compute parts of that relevance expression. For example, a web server is going to compute such part that's applicable to a web server and make that information available. The results of the computation can be made known, or available, by broadcast or by a whiteboard, for example, and made available to other devices, other elements, or other computing contexts in the environment. Such computing contexts can make decisions based on the result of the computation.

Thus, a collective decision is made based on a computation that happens in part distributed around the environment.

It should be appreciated that the computing elements may not be making the same decision.

As an example, a policy language may be computed throughout an environment, e.g. the part of the environment that is applicable or has the compute time. For example, a policy may be created that has relevance in it. Part of the relevance expresses that an element has certain computational capabilities, if the element has a certain amount of disk space available, or if the element has a certain amount of CPU available, then evaluate the policy.

It should be appreciated that the policy may not have anything to do with the asset that the element is running on. It may be that the element has enough space to run the policy.

Other examples may include: if an element has a particular processor, if an element sits on a fast network link and has high bandwidth access to particular data sets, then such computing element performs the execution.

Types of Relevance Environments

In an embodiment, an agent does not have to be associated with a device. For example, an entity may comprise a plurality of relevance environments running in it, each available to perform computation based on non-local inspection and tell other computing elements what to do. As another example, an agent may be associated with an application. As another example, a relevance engine may be running in a virtual environment.

As another example, one can contemplate computing a relevance expression about the security of a network, for example on a scale of one to 10. To achieve the end result, one may create a relevance, e.g. a policy, running in a relevance environment, e.g. on a relevance engine, that performs the computation. To perform the computation, the relevance engine may request that the environment evaluates relevance expressions on every computing element against the network, the infrastructure, and traffic. Thus, relevance expression is computed against something that at first is conceptual, as security of an environment may be considered a concept.

Thus, an embodiment provides distributed relevance and distributed computation that empowers an environment to manage against characteristics of the way the environment is designed to be.

In an embodiment, a policy may be evaluated in one place or computed across the environment and aggregated in some place. Such information is then made available. For example, an enterprise may have policies running everywhere that indicate they are running against a router. When the associated security environment has fallen, the computed value is made available so that the router is reconfigured based on the computed value.

Example Embodiments of Computed Relevance Messaging with Remote Attributes

Remote Attributes

It should be appreciated that the invention herein extends the notion of information accessible to a relevance determination system or process that includes information remotely accessible to an agent to further include information available to an agent from one or more other agents also making relevance determinations, and the computed result of relevance determination on these one or more other agents in the environment. For the purposes of discussion herein, information that is remote means information that is remote from the perspective of a particular agent, where the information is about a computing element for which another agent and not the particular agent, may be responsible. As discussed above, an agent views properties of the device it is managing and properties of other devices in the environment both directly and indirectly by exchanging information with one or more other agents in the environment. An embodiment provides mechanisms by which an agent accesses or exchanges information between or among other agents, including one or more of: central bulletin board, broadcast, direct request—pull, direct request—push; and server-routed.

Central Bulletin Board

Figure 3:
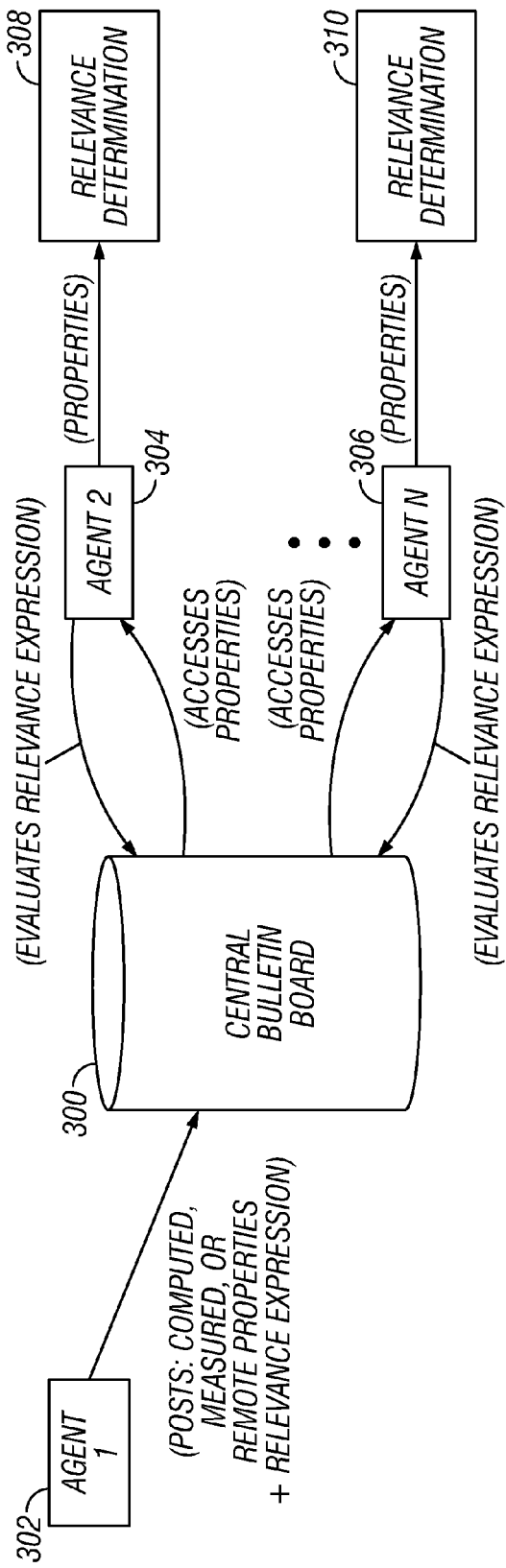
FIG. 3 is a schematic diagram showing the relationships of and the interactions between agents, determining relevance, and a central bulletin board, according to an embodiment.

A central bulletin board can be understood with reference to FIG. 3. In an embodiment, an agent 302 publishes computed, measured, or remote properties accessed from one or more other agents, e.g. Agent 2 (304) and Agent N (306), and available to the agent, to a centralized bulletin board 300 or database so that they may be accessed by other agents as remote properties for inclusion in relevance determination, e.g. by relevance determination processor 308 for Agent 2 (304) and relevance determination processor 310 for Agent N (306). In an embodiment, communication is facilitated by a hierarchy of one or more relay agents that perform one or more of: relay, aggregate, compress, cache, encrypt or authenticate communication from an agent to a centralized bulletin board or database.

Agents identify information appropriate for their consumption by evaluating a relevance expression posted to the central board and associated with the information, e.g. "If the accessing agent is a database server then retrieve the information", an ID, or other mechanism.

Broadcast

Figure 4:
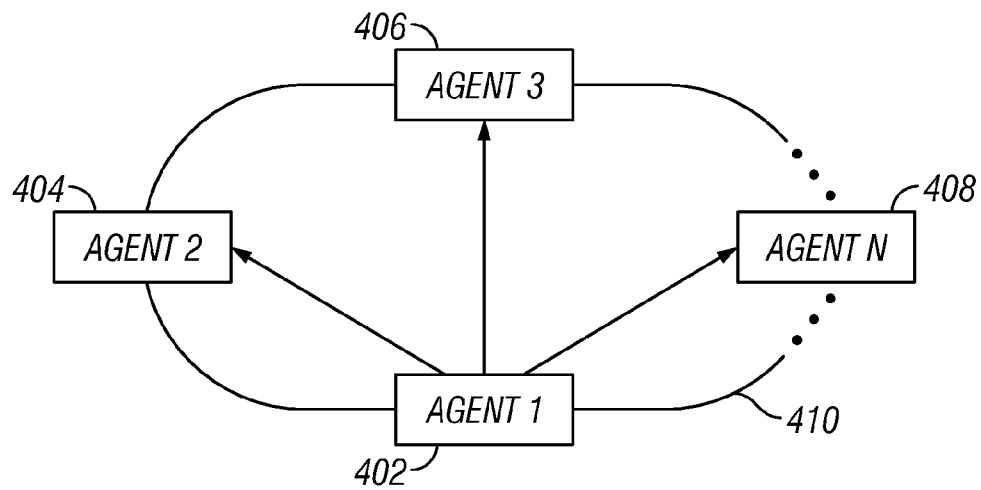
FIG. 4 is a schematic diagram showing an agent broadcasting properties and a relevance expression to other agents on a subnet of the broadcasting agent, according to an embodiment.

Broadcasting by an agent may be understood by reference to FIG. 4. In an embodiment, an agent, e.g. Agent 1 (402), may broadcast computed, measured, or remote properties available to other agents, e.g. Agent 2 (404), Agent 3 (406), and Agent N (408), on a local network 410 so that the remote properties are available to other agents proximate to the broadcasting agent. In an embodiment, this broadcast may be by means of User Datagram Protocol (UDP) message format to all other agents on the broadcasting agent's subnet.

Direct Request—Pull

Figure 5:
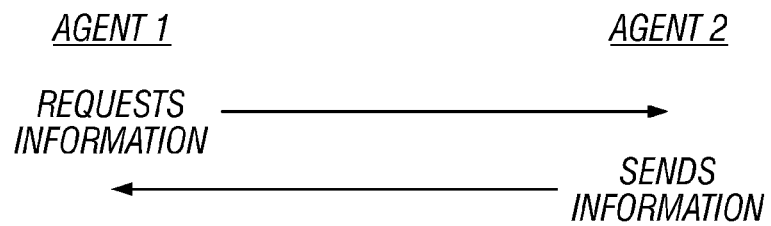
FIG. 5 is a flow diagram showing an agent pulling information from another agent by a direct request, according to an embodiment.

Direct request—pull may be understood by reference to FIG. 5. In an embodiment, an agent, e.g. Agent 1, directly requests information from one or more agents, e.g. Agent 2, in the environment in one or more of a: one-time, as-needed, or a scheduled basis. In an embodiment, the list of agents and associated properties from which to determine remote properties is itself obtained by one or more methods of remote property communication.

Direct Request—Push

Figure 6:
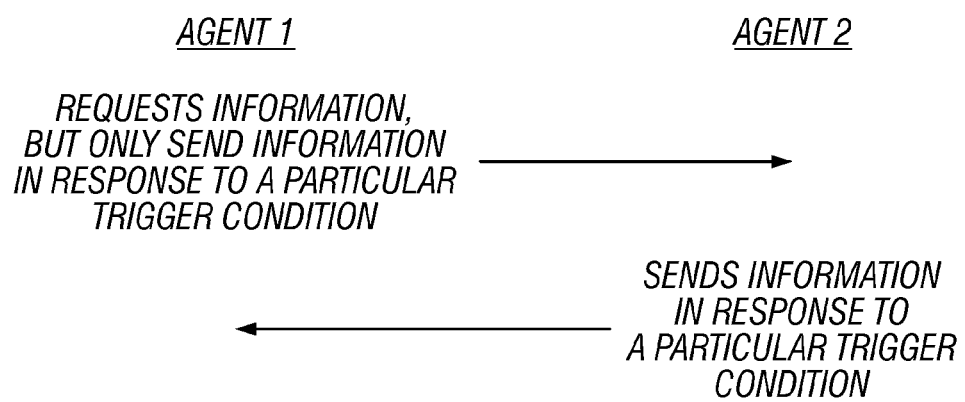
FIG. 6 is a flow diagram showing an agent requesting information based on trigger conditions in push fashion from another agent, according to an embodiment.

Direct request—push may be understood by reference to FIG. 6. In an embodiment, an agent, e.g. Agent 1, directly requests information from one or more agents, e.g. Agent 2, in the environment and further request that the remote properties be returned to the requesting agent based on one or more of: the values of a requested property has changed, a schedule, or some other trigger condition. In an embodiment, the list of agents and associated properties from which to determine remote properties is itself obtained by one or more methods of remote property communication.

Server—Routed

An embodiment provides a model by which agents expose properties of the devices they manage (not shown). Such properties may be the result of a relevance evaluation, for example. In the embodiment, such properties are communicated to a central server. In the embodiment, an agent wishing to communicate with, e.g. ask a question of, one or more other agents and sends a message up to the central server through the relay hierarchy. The first part of the message describes the properties/values of the agents targeted for the message, and the second part contains the relevance expression that composed the question. The central server directs the message to receiving agents, down through the relay hierarchy, based on the properties exposed by agents. In an optimization, the relays retain the values of the properties exposed by agents for message targeting, and directly route messages to any relay/agent below the routing relay in the hierarchy that is relevant to receive the message. In such optimization, the central server need not route a message to any agent that reports to a relay through which an agent is communicating properties to the central server.

Policy Aware Infrastructure Overview

Policy Aware Infrastructure

In an embodiment, models are provided whereby one empowers the devices and other entities in the environment with knowledge about what to do and how to do it. The entities work together coupled, such that the end result is that the infrastructure modifies itself dynamically according to whatever policy was used.

Figure 7A:
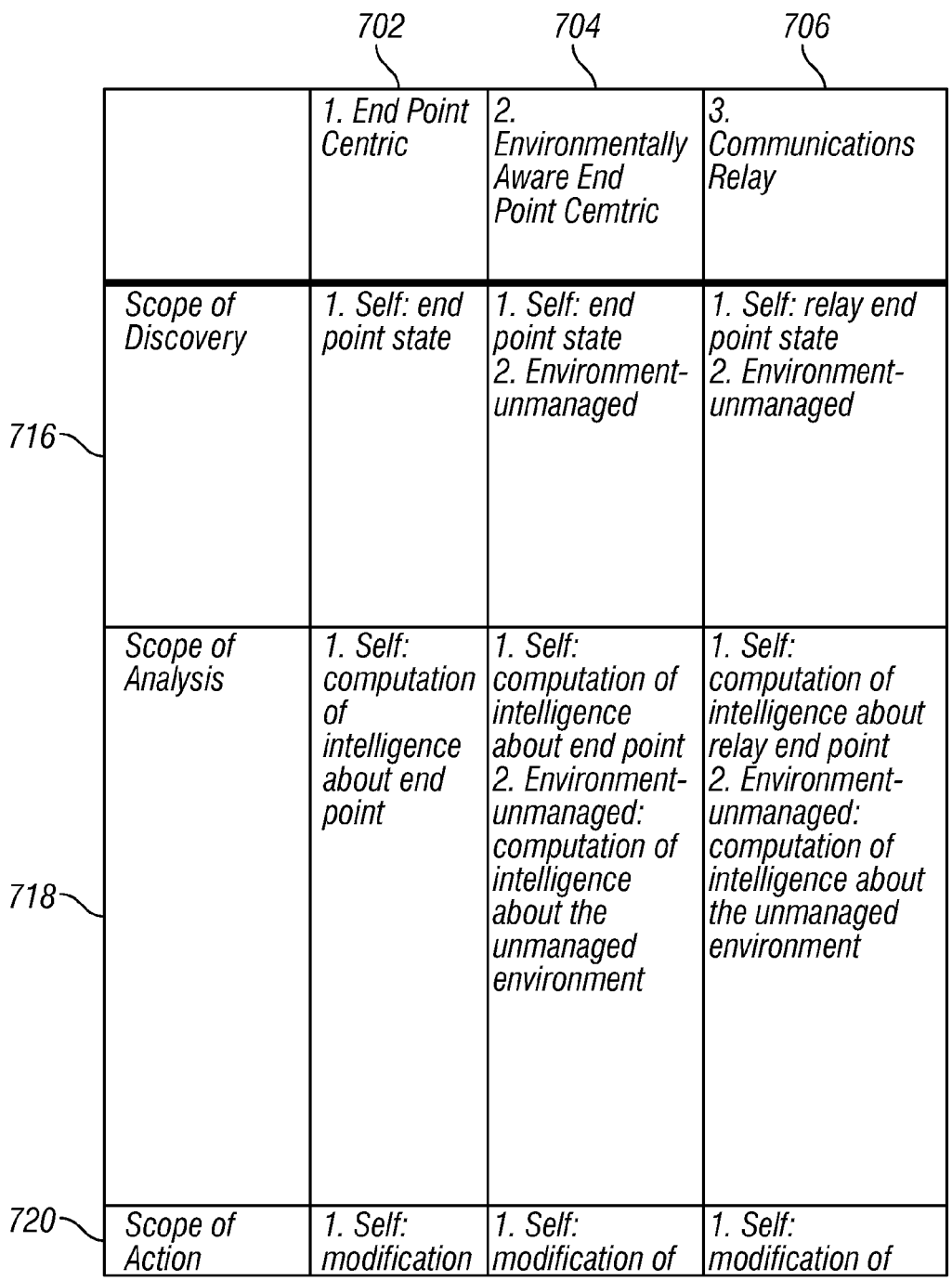
FIG. 7 is a chart spanned over FIGS. 7a, 7b, and 7c showing the seven architectural models as described by seven characteristic types, according to an embodiment.

An embodiment of the invention can be understood with reference to FIG. 7, a chart spanned over FIGS. 7a, 7b, and 7c showing the seven architectural models as described by seven characteristic types, according to an embodiment and discussed in further detail hereinbelow.

Discussion of Characteristics

Scope of Discovery 716

In an embodiment, the scope of discovery concerns how broadly can a computing element see, understand its world around it? Can it only understand the world of the computer environment that it lives on? Can it understand the computing environment of nodes or devices adjacent to it in the network sense, if it is on the same subnet? Can it understand the scope of the environment for devices that report to its same relay, or that are associated in some architectural sense with the deployment? Or, can it interact with other devices, other agents, other computing environments that are associated by some arbitrary criteria that may change or evolve over time? Such is included in the spectrum of scope of discovery.

Scope of Analysis 718

In an embodiment, the scope of analysis addresses whether a decision can be made based on something which is can you actually make decisions based on that. For example, can one have some understanding based on this spectrum of the very street a person lives one to the broad universe that a person lives in.

Scope of Action 720

The scope of action addresses what an entity has control over. Can the entity make decisions based on information from its environment? Can it only control itself? Can it only make changes related to itself? Or does it have a scope of action at the other end which enables it to make a change or modify a state anywhere in the environment?

In-Bound Communication 722

In an embodiment, in-bound communication addresses how does an entity know? How does it get policies and command and information from elsewhere in the environment? Is it very hierarchical, or is it completely amorphous and malleable based on circumstances in the environment?

Out-Bound Communication 724

In an embodiment, out-bound communication is analogous. How does an entity talk to other environments; how does it communicate what it knows about itself or about the environment? Does it communicate up through a central point, and then other computing elements get it from that central point?

Or at the other spectrum, does it add the ability to communicate or discover, communicate directly with other computing elements, discover them, and is that highly flexible, and does it change based on context?

Decision Processing/Policy Evaluation 726

In an embodiment, decision processing/policy evaluation addresses: How is the decision making performed? Is it performed in the context of a single computing element, or does the infrastructure divide up the decision making so that various parts of the decision making are performed all over the environment? Should the computation be divided up, is decision making entirely centralized, or is it decoupled and distributed?

Trust Model 728

An embodiment provides a trust model. For example, if an architectural model allows effectively broadcasting to any entity, such as a relevant expression and action in a relevance expression, how does the entity know or trust that such message it received comes from a computing element that is entitled to tell it to do something? How does the entity know or trust that the communication has not been tampered with? That is, the more and more such computation is distributed, the more and more important the trust model becomes to practical application in the real world.

An embodiment provides standard trust management capabilities. For example, mechanisms such as PKI model, digitally signing messages, managing and distributing the keys, validating chain of authority, that the message comes from an authentic place and has not been tampered with and that the sender has legitimate rights to approve or command an action, or to send a particular message, are provided.

An embodiment provides trust at different levels. For example, in a case where Agent A is asking Agent B to evaluate a relevance expression and return a result, a trust model is required so that Agent B knows that Agent A has rights to talk to it and is a valid agent, and has the right to get at the information that it's asking for. And by the same token, in a model where Agent A is asking Agent B to do something, make a change, Agent B needs to understand that Agent A again has those set of rights.

An embodiment provides standard encryption mechanisms for encrypting messages between computing elements.

An embodiment provides a mechanism by which an administrator has rights to take actions on certain sets of agents.

An Implementation

For example, a particular embodiment of an authentication and encryption model can be understood in co-assigned U.S. patent application, entitled, PLATFORM FOR POLICY-DRIVEN COMMUNICATION AND MANAGEMENT INFRASTRUCTURE, to J. Fan et al, which is incorporated herein in its entirety by this reference thereto.

According to such embodiment, a platform provides a security model having at least the following capabilities:

Clients can trust content received from the Server. All commands and questions that clients receive are signed by a key that can ultimately be verified against a public key that is distributed to all Clients at install time; and Clients can submit reports to the server without risk of snooping. The Client can choose to encrypt the reports it sends up to the server, so that no attacker can see what the report contains.

In the foregoing approach, clients are assigned unique identifiers when they register. Any entity, such as a machine or network, that requests a registration interaction with the server is issued a unique identifier and is trusted. Many of the properties associated with a particular client that can be viewed by an operator by way of the UI to a console are aligned with that client based on that identifier that was handed out at the time of registration. Accordingly, the foregoing approach provides strong authentication of the server and the administrators by the endpoints (clients). That is, whenever a client receives a command from an administrator, the client knows exactly who issued it by virtue of the strong cryptographic mechanisms. Additionally, the channel can be encrypted through strong cryptographic mechanisms. However, information flowing in the opposite directions, from endpoints (clients) into the system, is not authenticated because there previously has not existed a reliable way to authenticate the endpoints. Not being able to reliably authenticate an endpoint may provide an opportunity for such attacks as spoofing, in which a person or program successfully masquerades as another by falsifying data and thereby gaining some illegitimate advantage.

There exist, for example, simple techniques that attackers use to spoof information, such that the console would display the spoofed information as if it were genuine—as if it was coming from the particular client associated to a particular client identifier. Thus, a client authentication mechanism, in which a cryptographic credential is established on each client (endpoint), provides a much stronger, more robust security model that greatly minimizes the risk of spoofing attacks.

Thus, in an embodiment, the client authentication mechanism extends the previous security model to include a mirror image of the above-mentioned capabilities:

Clients sign every report submitted to the server, which is able to verify that the report does not come from an attacker; and Servers can send data to clients without risk of snooping. The server can encrypt data that it sends to a client so that no attacker can see what data is being sent to the client.

While such a model is well-suited to a use case in which clients send reports to the Server, it is also applicable to various use cases in which clients authenticate each other in a similar way.

The foregoing embodiments of the security model present complementary challenges:

The first approach involves generation of a single private/public key pair and distribution of many copies of the public key. Additionally, at install time, the installer naturally has the right to tell a client to trust a server because the installer has control over the client; and The client authentication mechanism involves generation of many private/public key pairs and wide distribution of each of the many public keys. Additionally, there exists no immediate way to prove that an installer has the right to tell the server to trust the client, because the installer may be unknown. For example, the installer may be an attacker installing a new client on his/her own machine, pretending to be some other resource.

A solution to the above challenges allows anyone to enter the system and generate a new identity and builds trust from that starting point, unlike conventional security systems, which specifically require that a new resource be explicitly joined to the system by an Administrator. For example, at an initial registration, a client produces a public/private key pair. The server then grants a unique computer ID which the server associates to public key. Thus, after registration, the computer ID and the public key are associated to the particular unique client.

Assuming that the private key created on the client is not distributed to any other devices, it can authenticate content coming from that client, making it possible to verify any messages sent from the client.

Example Embodiment of Policy Aware Infrastructure

As discussed hereinabove, one may desire to manage an entire diverse collection of machines, including virtual machines, to obtain visibility into characteristics of the collection as a whole, to make decisions, and potentially make changes, i.e. control the collection of the whole. Such concept can be understood by the example of computing a relevance expression about the security of a network on a scale of one to 10. Security of a network may be considered a concept at least because security of a network is subjective. A particular configuration that provides network security for one enterprise may not be considered secure for a second enterprise.

As another example, consider a case where an information technology (IT) administrator needs to upgrade all the software of and to restart 100 different servers. It should be appreciated that there are relationships between those servers and that they may need to be restarted in a particular order.

As well, the variety of devices is immense and in all likelihood will continue to increase. Examples of devices include mobile phones, smart devices, desktop computers, server computers, wireless handheld devices, and so on. As well, it should be appreciated that the context level, such as client, server, agent, pseudo-agent, end point, etc., may be just as or more diverse. Thus, providing techniques and mechanisms that enable monitoring and controlling such diverse entities at such diverse levels within a computing environment may be challenging.

One particular model, the end point model, has been implemented by BigFix Enterprise Suite™ (BigFix, Inc, Emeryville, Calif.), which brings devices in such system under management by installing a native agent on each device, as discussed hereinabove. However, as the notion that the agent has extended beyond a consumer computer to devices or logical structures, such as pseudo-agents, that are physically or logically proximate to a consumer computer, so is there the desire to extend the end point model by growing a host of different classes of models. Such classes of models provide structure and reliability to address and incorporate the extending types of devices, placements or context level of devices, and their empowering capabilities for visibility into and control of other devices as well as themselves. Put another way, an embodiment provides classes of models, including the end point model, for providing an infrastructure by which entities are empowered by and aware of policy, such as enterprise policy.

An example embodiment of policy aware infrastructure can also be understood with reference to FIG. 7.

Some Core Ideas

It is contemplated that agents/policy engines live in different, new, environments, e.g. move up the stack; can't stay limited to end points only It is contemplated that agents be able to address a new class of problems that involve interdependent groups It is contemplated that peer to peer communication addresses this new class of problems It is contemplated that collaborative decision making may not preclude decision making by a super agent Proposed Models for Distributed, Policy-Based, Management of IT Infrastructure The following are descriptions of models for the distributed implementation of a policy based management model.

1. End point centric model 702
2. Environmentally aware end point centric model 704
3. Communications relay 706
4. Universal management relay 708
5. Peer to peer model—for discovery 710
6. Peer to peer model—for discovery, for control—individual decision making 712
7. Peer to peer model—for discovery, for control—collaborative decision making and workflow 714

Models 1, 2, and 3 are well suited to highly distributed environments and to problems that involve limited co-dependency between the managed entities. Hence the primary management communication mechanism is from the agent to the server (there is no peer to peer communication).

Model 4 involves relays to improve the way to solve management problems, e.g. software or operating system provisioning to remote offices, vulnerability scanning, etc.

With these models, the invention addresses "Every device, any time, anywhere".

Models 5, 6, and 7 are suited to problems that cut cross multiple managed entities, hence requiring communication between them. Developing an architecture supporting these models may have the following benefits:

Allows expanding beyond "device management" to other domains (e.g., business service management, application management, etc.)

Provides even faster and more dynamic response to events due to more localized decision making Importantly, such approach allows the same agent to operate under any of these management models, and in any of the roles they prescribe.

1. End point centric model (e.g. base model as described in U.S. Pat. No. 7,277,919)
  1. Scope of Discovery:
  Self: end point state
  2. Scope of Analysis:
  Self: computation of intelligence about end point
  3. Scope of Action:
  Self: modification of end point state
  4. In Bound Communication:
  Hierarchical: from server to end point
  5. Out Bound Communication:
  Hierarchical: from end point to server
  6. Decision Processing/Policy Evaluation:
  Self-contained: individually performed by the agent
  7. Trust Model:
  Master and slave model: server (trusted source of policy) to agents (each individually affiliated to its server).

EXAMPLES

Patching: an agent evaluates the relevance of a new OS patch against the OS state of its host device. Action is application of a patch and/or report.

2. Environmentally Aware, End Point Centric Model
  1. Scope of Discovery:
  Self: end point state
  Environment-unmanaged
  2. Scope of Analysis:
  Self: computation of intelligence about end point
  Environment-unmanaged: computation of intelligence about the unmanaged environment
  3. Scope of Action:
  Self: modification of end point state
  4. In Bound Communication:
  Hierarchical: from server to end point
  5. Out Bound Communication:
  Hierarchical: from end point to server
  6. Decision Processing/Policy Evaluation:
  Self-contained: individually performed by the agent
  7. Trust Model:
  Master and slave model: server (trusted source of policy) to agents (each individually affiliated to its server).

Example Use Case:

Environmentally aware anti-threat management: an end point scans its network environment (e.g., "end point is using Starbucks network"), determines appropriate configuration of firewall, and execute change in state.

Note: in this model, environmental awareness extends to the unmanaged environment only. Agents evaluate policies based upon information they discover in the environment, e.g. via a scan. They do not evaluate information provided to them by other agents. This means there is no communication between agents.

3. Communication relay (e.g. the Relay model as discussed in co-assigned U.S. patent application entitled, CONTENT-BASED USER INTERFACE, APPARATUS AND METHOD to Ward-Karet et al, which is incorporated herein in its entirety by this reference thereto.)
  1. Scope of Discovery:
  Self: relay end point state
  Environment-unmanaged
  2. Scope of Analysis:
  Self: computation of intelligence about relay end point
  Environment-unmanaged: computation of intelligence about the unmanaged environment
  3. Scope of Action:
  Self: modification of relay end point state
  4. In Bound Communication:
  Hierarchical: from server to relay
  Hierarchical: from end points to relay
  5. Out Bound Communication:
  Hierarchical: from relay to server
  Hierarchical: from relay to end points 6. Decision Processing/Policy Evaluation:
Self-contained: individually performed by the agent
7. Trust Model:
Master and slave model: server (trusted source of policy) to relay (each individually affiliated with its server); server to agents (each individually affiliated to its server).
Example Use Case:
Communication relay: "adaptive" routing of communications between server and end points based upon network conditions and topology; caching of policy information; caching of execution payload, etc.

4. Universal Management Relay (Expanded Relay Model/ "Repurposing of any Device")
1. Scope of Discovery:
Self: relay end point state
Environment-unmanaged
2. Scope of Analysis:
Self: computation of intelligence about relay end point
Environment-unmanaged: computation of intelligence about the unmanaged environment
3. Scope of Action:
Self: modification of relay end point state
Environment unmanaged
Environment managed
4. In Bound Communication:
Hierarchical: from server to relay
Hierarchical: from end points to relay
5. Out Bound Communication:
Hierarchical: from relay to server
Hierarchical: from relay to end points
6. Decision Processing/Policy Evaluation:
Self-contained: individually performed by the agent
7. Trust Model:
Master and slave model: server (trusted source of policy) to relay (each individually affiliated with the agents (each individually affiliated to its server).
Example Use Case:
Scanning service: end point performs a vulnerability scan on a given part of the environment.
Intelligence service: end point aggregates information from a variety of sources (scans of environment it performs, and information from third party sources with which it can communicate either through standards or through actual integration). End point analyzes information. End point publishes reports to server.
Processing service: OS provisioning: end point caches reference OS images, and co-manages the process of imaging of local device
Processing service: SW distribution (similar as above)
Processing service: SW streaming (similar as above)
Note: in this model the scope of action can include the managed environment (e.g., a "relay" distributes SW to a end point under management). However, the control of one end point by another may happen outside the main management communication mechanism, e.g. fixlet/policy.

5. Peer to Peer Model—For Discovery
1. Scope of Discovery:
Self: relay end point state
Environment-unmanaged
Environment-managed (other end points provide input in discovery)
2. Scope of Analysis:
Self: computation of intelligence about relay end point
Environment-unmanaged: computation of intelligence about the unmanaged environment
Environment-managed: computation of intelligence about the managed environment
3. Scope of Action:
Self: modification of relay end point state
Environment unmanaged
Environment—managed
4. In Bound Communication:
Hierarchical: from server to relay
Hierarchical: from end points to relay
Peer to peer: for collection of discovery information
5. Out Bound Communication:
Hierarchical: from relay to server
Hierarchical: from relay to end points
Peer to peer: for publication of discovery information
6. Decision Processing/Policy Evaluation:
Self-contained: individually performed by the agent
7. Trust Model:
Master and slave model: server (trusted source of policy) to relay (each individually affiliated with the agents (each individually affiliated to its server).
Peer to peer: agent to agent trust for discovery
Example Use Case:
Anti-threat: an agent on end point that has become compromised publishes a report service that is subscribed to by other agents. These agents use this information to modify their own configuration.
It should be appreciated that there can be various forms of this mode of communication:
An Service Oriented Architecture approach where agents publish information as services
An approach that is not really peer to peer, but rather, mediated via the central source of trust (BES server): information is initially reported to the BES server (central source of trust) and then incorporated in policy fixlets which are published to other agents.

6. Peer to Peer Model—for Discovery—for Control—Individual Decision Making
1. Scope of discovery:
Self: relay end point state
Environment-unmanaged
Environment-managed (other end points provide input in discovery)
2. Scope of Analysis:
Self: computation of intelligence about relay end point
Environment-unmanaged: computation of intelligence about the unmanaged environment
Environment-managed: computation of intelligence about the managed environment
3. Scope of Action:
Self: modification of relay end point state
Environment unmanaged
Environment managed
Environment managed—via policy
4. In Bound Communication:
Hierarchical: from server to relay
Hierarchical: from end points to relay
Peer to peer: for collection of discovery information
5. Out Bound Communication:
Hierarchical: from relay to server
Hierarchical: from relay to end points
Peer to peer: for publication of discovery information
Peer to peer: for publication of a policy to another agent
6. Decision Processing/Policy Evaluation:
Self-contained: individually performed by the agent
7. Trust Model:
Master and slave model: server (trusted source of policy) to relay (each individually affiliated with the agents (each individually affiliated to its server).
Peer to peer: agent to agent trust for discovery Peer to peer agent to agent trust for publishing of policy from one agent to another In this model, an agent can publish a policy to another agent in order to achieve control of that agent.

Figure 8:
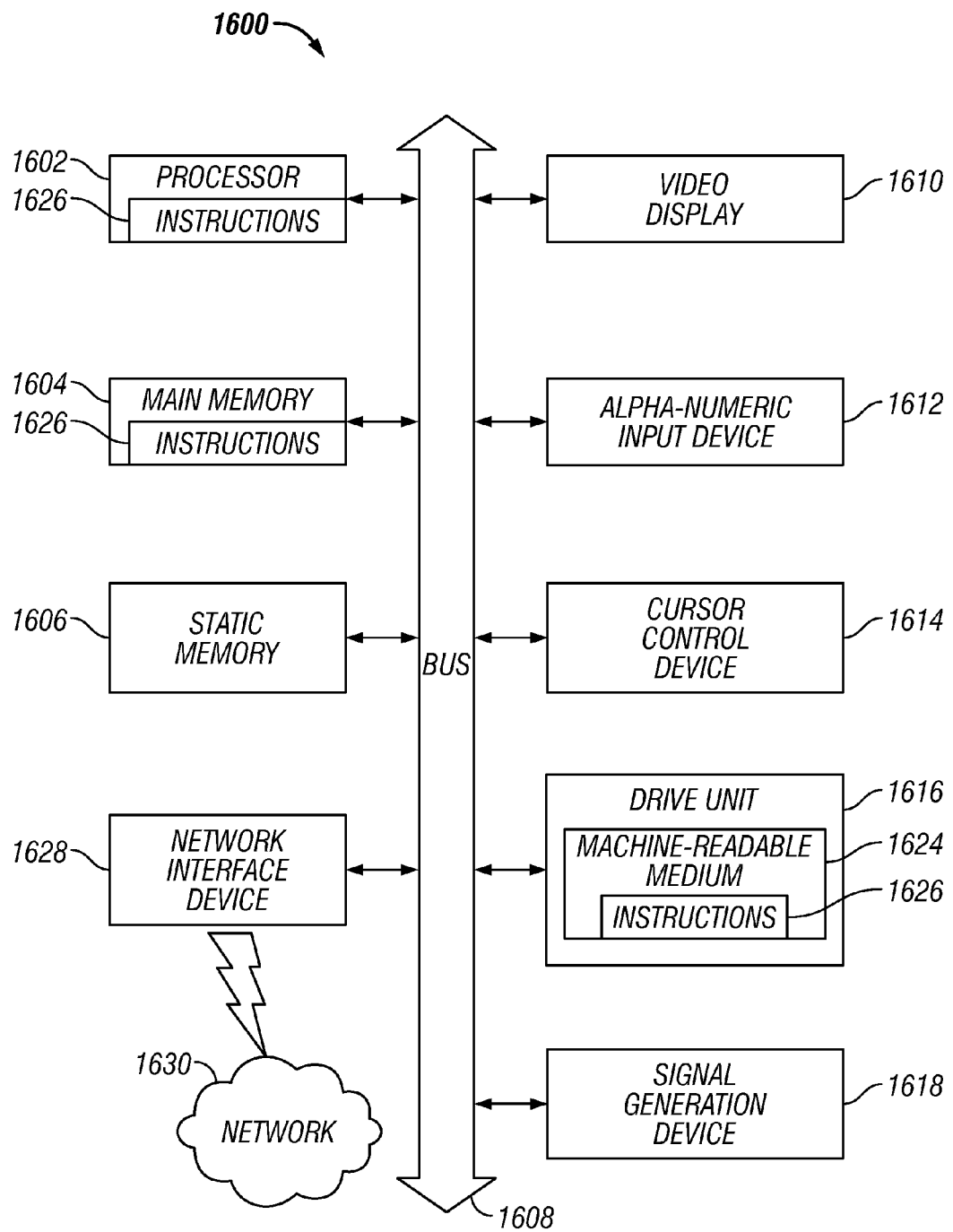
FIG. 8 is a block schematic diagram of a system in the exemplary form of a processor implemented computer system within which there is a set of instructions for causing the system to execute any one or more of the functions and/or steps of the embodiments of the invention disclosed herein.

Example Use Case:
  Super Agent: patch management for a cluster of Unix machines: super agent evaluates policy and determines action with input from agents on the clustered machines; orchestrates execution of the process
  Super Agent: dynamic anti-threat management:
7. Peer to Peer Model—For Discovery—For Control—Collaborative Decision Making and Workflow
  1. Scope of discovery:
  Self: relay end point state
  Environment-unmanaged
  Environment-managed (other end points provide input in discovery)
  2. Scope of Analysis:
  Self: computation of intelligence about relay end point
  Environment-unmanaged: computation of intelligence about the unmanaged environment
  Environment-managed: computation of intelligence about the managed environment
  3. Scope of Action:
  Self: modification of relay end point state
  Environment unmanaged
  Environment managed
  Environment managed—via policy
  4. In Bound Communication:
  Hierarchical: from server to relay
  Hierarchical: from end points to relay
  Peer to peer: for collection of discovery information
  5. Out Bound Communication:
  Hierarchical: from relay to server
  Hierarchical: from relay to end points
  Peer to peer: for publication of discovery information
  Peer to peer: for publication of a policy to another agent
  6. Decision Processing/Policy Evaluation:
  Self-contained: individually performed by the agent
  Collective: multiple agents participate in a shared policy evaluation workflow
  7. Trust Model:
  Master and slave model: server (trusted source of policy) to relay (each individually affiliated with the agents (each individually affiliated to its server).
  Peer to peer: agent to agent trust for discovery
  Peer to peer: agent to agent trust for publishing of policy from one agent to another An Example Machine Overview FIG. 8 is a block schematic diagram of a system in the exemplary form of a computer system 1600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for computed relevance messaging with remote attributes, comprising the steps of:
  communicating, by a first agent, computed, measured, or remote properties and a relevance expression to one or more other agents;
  said one or more other agents evaluating said relevance expression to determine whether said communication is intended for consumption by the one or more other agents;
  when said communication is intended for consumption by the one or more other agents, the one or more other agents:
    determining relevance based on said computed, measured or remote properties;
    taking one or more actions based upon said determining relevance; and reporting results of any of said evaluating, determining relevance, and taking one or more actions to a management system;

wherein communicating said computed, measured, or remote properties and relevance expression comprises any of the steps of:

said first agent posting said computed, measured, or remote properties and relevance expression to a central bulletin board accessible by said one or more other agents;

said first agent broadcasting said computed, measured, or remote properties and relevance expression to said one or more other agents;

said first agent requesting said computed, measured, or remote properties directly from said one or more other agents;

said first agent requesting said computed, measured, or remote properties directly from said one or more other agents along with a condition that said one or more other agents send the requested computed, measured, or remote properties in response to a particular trigger condition; and said first agent sending said computed, measured, or remote properties and relevance expression to a central server through a relay hierarchy and said central server delivering through said relay hierarchy said computed, measured, or remote properties and relevance expression to those agents, of the one or more agents, that are targeted by said first agent in said properties, wherein said delivering is achieved by comparing said properties to exposed properties at said central server, wherein exposed properties are properties previously communicated to said central server by any agent; and wherein said first agent broadcasting said computed, measured, or remote properties and relevance expression to said one or more other agents further comprises said first agent broadcasting on a local network and wherein said one or more other agents are proximate to said first agent.

2. The method of claim 1, wherein said communication is facilitated by a hierarchy of one or more relay agents that perform any of: relay, aggregate, compress, cache, encrypt and authenticate communication from said first agent to said central bulletin board.

3. The method of claim 1, wherein requesting said computed, measured, or remote properties directly is performed: by any of: a one-time, an as-needed, or on a scheduled basis.

4. The method of claim 1, wherein a particular trigger condition is any of: a value of a requested property has changed and a schedule.

5. The method of claim 1, wherein said remote properties were determined from a list of agents and associated properties and wherein said list is obtained by: one or more methods of remote property communication, said one or more methods comprising any of: posting to a bulletin board, broadcasting, directly requesting and directly requesting wherein the request is associated with a trigger condition.

6. The method of claim 1, wherein said one or more agents comprises a plurality of agents and further comprising the step of computing, by each agent of said plurality of agents, a part of said relevance expression to result in a collective decision.

7. An apparatus for computed relevance messaging with remote attributes, comprising:

a first agent configured for communicating any of computed, measured, and remote properties and a relevance expression to one or more other agents;

wherein said one or more other agents are configured for evaluating, by a evaluating processor, said relevance expression to determine whether said communication is intended for consumption by the one or more other agents;

wherein said one or more agents are configured for when said communication is not intended for consumption by the one or more other agents, said one or more agents not consuming said communication and when said communication is intended for consumption by the one or more other agents, the one or more other agents further configured for:

determining relevance, by a determining relevance processor, based on said computed, measured or remote properties;

taking one or more action, by an actions processor, based upon said determining relevance; and reporting, by a reporting processor, results of any of said evaluating, determining relevance, and taking one or more actions to a management system;

wherein said first agent configured for communicating said computed, measured, or remote properties and relevance expression further comprises being configured for:

posting, by a posting processor, said computed, measured, or remote properties and relevance expression to a central bulletin board accessible by said one or more other agents;

broadcasting, by a broadcasting processor, said computed, measured, or remote properties and relevance expression to said one or more other agents;

requesting, by a first requesting processor, said computed, measured, or remote properties directly from said one or more other agents;

requesting, by a second requesting processor, said computed, measured, or remote properties directly from said one or more other agents along with a condition that said one or more other agents send the requested computed, measured, or remote properties in response to a particular trigger condition; and sending, by a sending processor, said computed, measured, or remote properties and relevance expression to a central server through a relay hierarchy and said central server delivering through said relay hierarchy said computed, measured, or remote properties and relevance expression to those agents, of the one or more agents, that are targeted by said first agent in said properties, wherein said delivering is achieved by comparing said properties to exposed properties at said central server, wherein exposed properties are properties previously communicated to said central server by any agent; and wherein said broadcasting said computed, measured, or remote properties and relevance expression to said one or more other agents further comprises broadcasting on a local network and wherein said one or more other agents are proximate to said first agent.

* * * * *